United States Patent
Pasternack

(10) Patent No.: US 10,120,838 B2
(45) Date of Patent: Nov. 6, 2018

(54) SYSTEMS AND METHODS FOR WEIGHTED SAMPLING

(71) Applicant: Facebook, Inc., Menlo Park, CA (US)

(72) Inventor: Jeffrey Pasternack, Atherton, CA (US)

(73) Assignee: Facebook, Inc., Menlo Park, CA (US)

(*) Notice: Subject to any disclaimer, the term of this patent is extended or adjusted under 35 U.S.C. 154(b) by 793 days.

(21) Appl. No.: 13/951,441

(22) Filed: Jul. 25, 2013

(65) Prior Publication Data

US 2015/0032761 A1  Jan. 29, 2015

(51) Int. Cl.
    *G06F 17/30* (2006.01)
    *G06F 17/18* (2006.01)
    *G06Q 50/00* (2012.01)

(52) U.S. Cl.
    CPC .......... *G06F 17/18* (2013.01); *G06F 17/3089* (2013.01); *G06F 17/30864* (2013.01); *G06Q 50/01* (2013.01)

(58) Field of Classification Search
    None
    See application file for complete search history.

(56) References Cited

U.S. PATENT DOCUMENTS

| | | | | |
|---|---|---|---|---|
| 2003/0018615 A1* | 1/2003 | Chaudhuri | ........ | G06F 17/30536 |
| 2009/0112945 A1* | 4/2009 | Camble | ............ | G06F 17/30162 |
| 2011/0173141 A1* | 7/2011 | Campbell | ......... | G06F 17/30038 706/12 |
| 2011/0251878 A1* | 10/2011 | Subramanian | ......... | G06Q 30/02 705/14.5 |
| 2012/0221563 A1* | 8/2012 | De | ................... | G06Q 10/06311 707/728 |
| 2013/0031104 A1* | 1/2013 | Gopinath | .......... | G06F 17/30867 707/748 |
| 2013/0245998 A1* | 9/2013 | Balestrieri | ............. | G06Q 10/06 702/179 |
| 2014/0095616 A1* | 4/2014 | White | ................... | G06Q 50/02 709/204 |

OTHER PUBLICATIONS

Pitla, Saikiran et al. "Finding the Kth largest item in a list of n items." Department: Computer Science Indiana State University Terre Haute,IN,USA. Dec. 17, 2011.*

* cited by examiner

*Primary Examiner* — Alicia Willoughby
(74) *Attorney, Agent, or Firm* — Sheppard Mullin Richter & Hampton LLP

(57) ABSTRACT

Techniques provided herein allow for a plurality of weighted samplings without replacement to be performed in O(n) time. According to some embodiments, the weighted sampling without replacement may be performed on a data set X of data elements $\{x_1, x_2, x_3, \ldots, x_n\}$, where each data element $x_i$ of the data set X has an associated weight $w_i$. The data set X may comprise data generated by a social networking system. Each data element $x_i$ in the data set X may be assigned with a random score $s_i$ based on the weight $w_i$ associated with the data element $x_i$. The random score $s_i$ can be used to perform weighted sampling without replacement.

17 Claims, 5 Drawing Sheets

SYSTEMS AND METHODS FOR WEIGHTED SAMPLING

FIELD OF THE INVENTION

The present application relates to sampling and, in particular, performing weighted sampling without replacement.

BACKGROUND

Social networks can accumulate substantial amounts of data. Such data can include, for example, information relating to user interaction, content posted by members, general behavioral information of users, and performance parameters regarding subsystems that support the social network. Of course, other types of data may be generated or collected by the social network. Because a large portion of humanity enjoys some connection to social networks, the amount of data managed by social networks is substantial.

The data managed by a social network can be used for many purposes. For example, the social network may analyze the data to assess the performance and operation of the social network. As another example, the social network may perform analytics on data maintained by it to better understand the nature of its users or their behavior. To analyze all of the data managed by a social network may pose significant computing challenges and costs. In view of the large volume of data, operations performed by the social network may be facilitated by reliance not on the entire volume of managed data but rather on samples thereof.

SUMMARY

Techniques provided herein allow for a plurality of weighted samplings without replacement to be performed in O(n) time. According to some embodiments, the weighted sampling without replacement may be performed on a data set X of data elements $\{x_1, x_2, x_3, \ldots, x_n\}$, where each data element $x_i$ of the data set X has an associated weight $w_i$.

In some embodiments, the data set X of n data elements, from which to generate a sample set of m data elements, may be identified. The data set X may be such that n≥m and each data element $x_i$ of the data set X has a weight $w_i$ associated with the data element $x_i$. Additionally, the data set X may comprise data generated by a social networking system. Each data element $x_i$ in the data set X may be assigned with a random score $s_i$ based on the weight $w_i$ associated with the data element $x_i$. Subsequently, m data elements in the data set X may be identified, such that the m data elements identified have assigned scores that are higher than scores assigned to remaining n−m data elements of the data set X. The m data elements identified comprise the sample set. The data set X may also be herein referred to as the "candidate data set."

In some embodiments, assigning each data element $x_i$ in the data set X with the random score may comprise generating the random random scores $s_i$.

In some embodiments, the random score $s_i$ may be generated according to the following formula: $s_i = r^{1/w_i}$, where r is a [0,1] real value drawn uniformly at random. The r may be drawn with a random number generator.

In some embodiments, identifying the m data elements may comprise: using a "Median of Medians" selection algorithm to identify an mth highest score $\bar{s}$, and identifying a particular data element of the data elements $x_i$ in the data set X having a particular score $s_i$ where $s_i \geq \bar{s}$.

In some embodiments, identifying the m data elements may comprise performing a structured query language (SQL) query. The SQL query may comprise a SELECT command configured to order data rows using scores assigned to the data elements of the set X. The SELECT command may be further configured to limit the data rows to first or last m rows once the data rows are ordered according to the scores assigned to the data elements.

In some embodiments, a probability of drawing the data element $x_i$ from the data set X is based on the associated weight $w_i$. The probability of drawing data element $x_i$ may be $$P(x_i) = \frac{w_i}{\sum_{j=1}^{n} w_j}.$$

In some embodiments, identifying the data set X of n data elements may comprise selecting the data set X.

In some embodiments, identifying the data set X of n data elements may comprise determining a set W including some or all of the weights associated with data elements of the data set X.

In some embodiments, a set W including some or all of the weights associated with the data set X is received.

In some embodiments, the data generated by the social networking system may comprise data used for machine learning.

In some embodiments, the data generated by the social networking system may comprise user behavior information.

In some embodiments, the data set X may comprise universal resource locators (URLs). For example, the URLs may be associated with postings on the social networking system. Each weight associated with a data element of the data set X may represent a number of impressions associated with the URLs.

In some embodiments, the data set X may comprise participants in a survey.

Many other features and embodiments of the invention will be apparent from the accompanying drawings and from the following detailed description.

Figure 1:
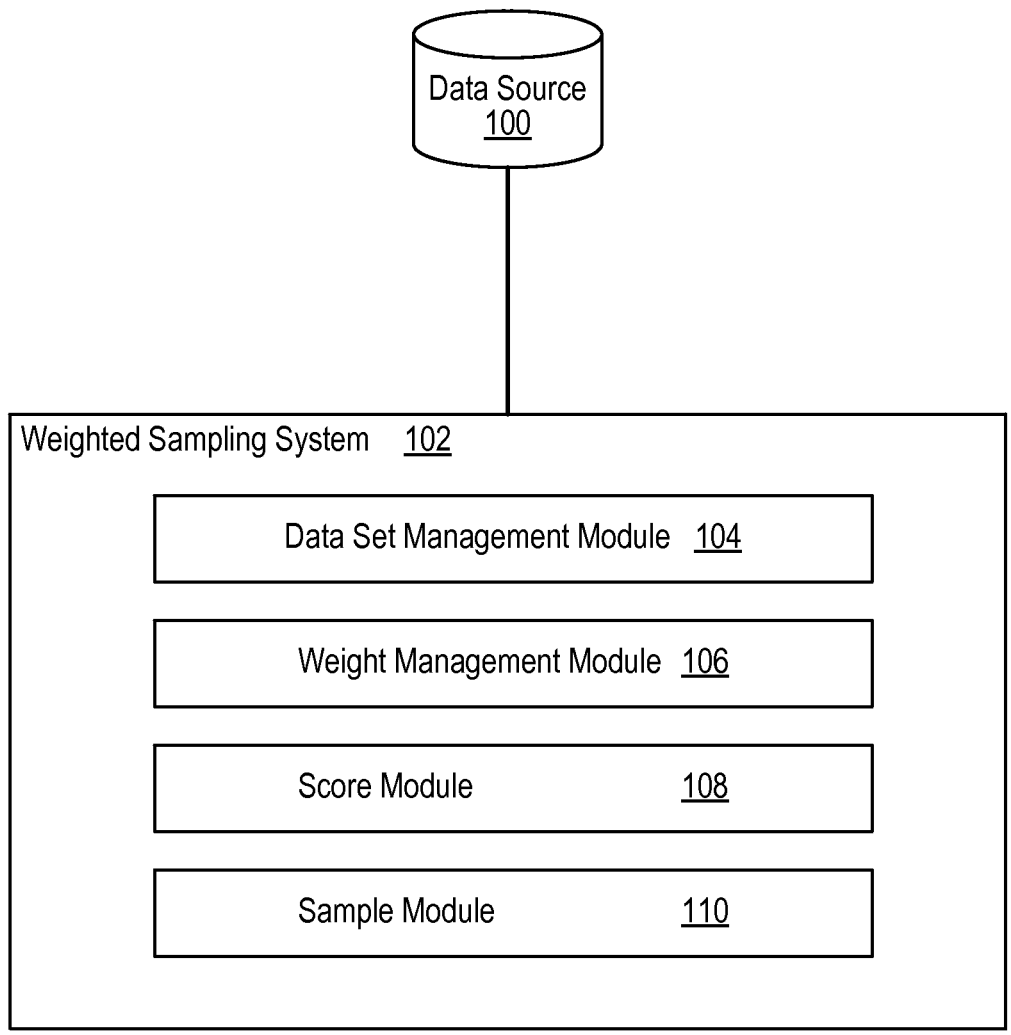
FIG. 1 illustrates an example of a weighted sampling system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Traditionally, weighted sampling with replacement can involve sampling from a set of elements $X=\{x_1, x_2, x_3, \ldots, x_n\}$ where each element $x_i$ has an associated weight $w_i$ and the probability of drawing an element $x_i$ from the set X. In this manner, the probability of selecting an element $x_i$ from the set X is proportional to its weight. In weighted sampling without replacement, a sequence of m weighted samples are performed on the set X and at each sample, an element $x_i$ is removed from the set X for subsequent sample iterations.

As an example, consider the set of $\{a, b, c\}$ where the weights of the elements are $w_a=3$, $w_b=2$, and $w_c=1$. Further consider where two samples are drawn from the set of $\{a, b, c\}$ without replacement. In view of the weights, in the first drawing, the probability of drawing a is $3/6$, the probability of drawing b is $2/6$, and the probability of drawing c is $1/6$. Assuming that b is the element selected in the first drawing, in the second drawing, the probability of drawing a is $3/4$ and the probability of drawing c is $1/4$.

Conventional methods for taking m weighted samples without replacement often take $O(n \cdot m)$ time to perform.

The systems and methods described herein can improve the performance time of weighted sampling without replacement. In various embodiments, the systems and methods of weighted sampling without replacement are performed on a data set X of data elements $\{x_1, x_2, x_3, \ldots, x_n\}$, where each data element $x_i$ in the set X has an associated weight $w_i$. In particular, the weighted sampling can comprise sampling $1 \leq m \leq n$ data elements from the set X without replacement, where each of the elements $x_i$ in the set X is assigned a random score $s_j$ based on the element's respective weight $w_i$. The random score $s_j$ may be generated for each data element $x_i$ in the set X based on the following formula: $s_j = r^{1/w_i}$, where weight $w_i$ is the weight associated with data element $x_i$ and r is a [0,1] real value drawn uniformly at random. The r may be drawn with a random number generator. In accordance with some embodiments, the systems and methods described herein can provide weighted sampling without replacement of m elements in linear processing time $O(n)$.

FIG. 1 illustrates an example of a weighted sampling system 102 in accordance with an embodiment of the invention. In FIG. 1, the weighted sampling system 102 is configured to perform weighted sampling, without replacement, of one or more data elements from a data set in accordance with various embodiments. As depicted in FIG. 1, the weighted sampling system 102 includes a data set management module 104, a weight management module 106, a score module 108, and a sample module 110. Additionally, FIG. 1 also depicts that the weighted sampling system 102 is coupled to a data source 100, which may be configured to provide the weighted sampling system 102 with data sets from which to sample. In an embodiment of the invention, the weighted sampling system 102 may include additional, fewer, or different components for various applications.

As described herein, the data source 100 can be configured to provide the weighted sampling system 102 with data sets on which to perform weighted sampling operations in accordance with various embodiments. According to some embodiments, the data source 100 may be a database system configured to process queries and provide results in response to the queries. For example, the data source 100 may be configured to process structured query language (SQL) queries and provide results comprising one or more data rows. During operation, the weighted sampling system 102 may perform one or more of its operations as queries submitted to the data source 100 for processing.

Depending on the embodiment, queries processed by the data source 100 may originate from the one or more components of the weighted sampling system 102. For instance, the query performed by the data source 100 may originate from the sample module 110 of the weighted sampling system 102. More regarding the sample module 110 is discussed herein.

The data provided by the data source 100 may vary based on the environment or use of the weighted sampling system 102. For instance, where the weighted sampling system 102 is configured to sample one or more example data elements from a database, the data source 100 may comprise a set of example data elements from which to sample. Likewise, where the weighted sampling system 102 is configured to analyze data relating to the operation or performance of a social networking system, such as the one described herein with respect to FIG. 4, the data source 100 may comprise data generated by the social networking system. The data generated by the social networking system may include various types of data, such as log data relating to events that occurred on the social networking system, information regarding user interaction on the social networking system, information regarding user behavior on the social networking system, performance of subsystems that support the social networking system, etc.

The data set management module 104 may be configured to manage one or more data sets on which the weighted sampling system 102 can perform weighted sampling without replacement. In some embodiments, the data set management module 104 can identify one or more data sets in the data source 100 from which to sample. As described herein, the data sets may include a data set X of data elements $\{x_1, x_2, x_3, \ldots, x_n\}$ of $n \geq 1$ data elements.

The data set management module 104 may identify a data set based on its relevance to the application for which it will be utilized. For instance, where the weighted sampling system 102 may be employed in ad monetization analysis in a social networking system, the data set management module 104 may identify a data set including identifiers of persons in a social networking system who have viewed an advertisement and associated ad revenue. To identify the data set, the data set management module 104 may submit one or more queries to the data source 100 for processing. Once identified, the data set management module 104 may be configured to retrieve data elements of the identified data set. In one embodiment, the data set management module 104 may maintain the retrieved data elements locally for subsequent processing.

The weight management module 106 may be configured to manage one or more sets of weights associated with the one or more data sets being managed by the data set management module 104. In some embodiments, the weight management module 106 can manage weights associated with the data sets by generating or collecting weights to be associated with data elements of the data sets. As described herein, for a data set $X=\{x_1, x_2, x_3, \ldots, x_n\}$, where each data element $x_i$ has an associated weight $w_i$, the associated weight $w_1$ may indicate the probability of drawing the data element $x_i$ from the data set X during a sampling process. For example, the associated weight $w_i$ may be defined by the equation:

$$P(x_i) = \frac{w_i}{\sum_{j=1}^{n} w_j}.$$ Equation 1

Accordingly, the weight management module 106 may generate weights based on the sampling probabilities associated with the data elements. In an embodiment, the sampling probabilities may reflect the relative significance or number of occurrences of each data element in a data set. In an embodiment, the sampling probabilities may represent other types of information. Once the weight management module 106 has generated weights for data elements, such weights may be stored locally to the weighted sampling system 102 for use in further processing. In an embodiment, the weight management module 106 may store the generated weights at the data source 100. When storing the generated weights either locally or at the data source 100, the weight management module 106 may do so such that the weights are stored in a data table that also contains the data elements (e.g., weights stored in the column of the data table containing the data elements), or in a data table that is separate from but associated with a data table containing the data elements. For some embodiments, the data table may be a database table.

It should be understood that in some embodiments, the data set may be stored by or otherwise provided to the weighted sampling system 102 by the data source 100 with the weights associated with the data set. For example, the data source 100 may comprise a data table where each data row corresponds to a different data element and the data table includes at least one data column comprising the weights of each corresponding data row.

The score module 108 may be configured to generate a score for data elements of the data set identified or otherwise obtained by the data set management module 104. According to some embodiments, the score may be a random score and may be based on the associated weight of a data element. As described herein, for a data set $X=\{x_1, x_2, x_3, \ldots, x_n\}$, each data element $x_i$ may have an associated weight $w_i$, which may indicate the probability of drawing the data element $x_i$ from the data set X during a sampling process. Accordingly, in some embodiments, the score module 108 may generate a random score $s_i$ for each data element $x_i$ in the set X based on the following equation:

$$s_i = r^{1/w_i},$$ Equation 2 where weight $w_i$ is the weight associated with data element $x_i$ and r is a [0,1] real value drawn uniformly at random. For some embodiments, the score module 108 may randomly generate r using a random number generator.

After a score is randomly generated, the score module 108 may store the randomly generated score in association with the given data element at the data source 100. In some embodiments, where data elements are stored as data rows in data tables, the randomly generated scores may be stored in a data column. It should be understood that in some embodiments, the randomly generated scores may be stored locally to the weighted sampling system 102. Additionally, the randomly generated scores may only be temporarily stored for use during one or more sampling sessions. The randomly generated scores may be regenerated at the beginning of a new sampling session.

The sample module 110 may be configured to select m data elements for the sample set based on the randomly generated scores that are assigned to them. As described herein, the sample module 110 may select m data elements from data set $X=\{x_1, x_2, x_3, \ldots, x_n\}$, such that the m selected data element have the m highest scores in the data set. In some embodiments, the sample module 110 may utilize a "Median of Medians" selection algorithm to identify an mth highest score $\bar{s}$, and identify a particular data element of the data elements $x_i$ in the data set X having a particular score $s_i$ where $s_i \geq \bar{s}$.

It should be understood that in some embodiments, the operations of the score module 108 and the sample module 110 may be combined into a single database query performed on one or more database tables. In particular, in some embodiments, a single database query may be performed on a database table such that weighted sampling without replacement can be performed for sampling m elements from a set of n elements (where n≥m) in linear processing time (e.g., O(n)). The database table may comprise data rows corresponding to data elements of a candidate data set, where the weights associated with each data element is included in the data row (e.g., in a weight data column). As described herein, the database system or the database table may reside on the data source 100. A suitable database query may comprise a query similar to the following example SQL query: "SELECT*FROM candidate_table ORDER BY POW(RAND( ), 1/weight) LIMIT m", where "candidate_table" is the name of the database table containing a candidate data set of data elements (e.g., $X=\{x_1, x_2, x_3, \ldots, x_n\}$), and "weight" is a data column in "candidate_table" containing the weight of each data row (e.g., $w_i$). Effectively, the example SQL query selects the first m data rows from the database table "candidate_table" when the data rows of the database table "candidate_table" are ordered according to the function "POW(RAND( ), 1/weight)", which is a SQL function call embedded in the single database query line. In the example SQL query, the function "POW(RAND( ), 1/weight)" implements Equation 2 as described herein. In various embodiments, the single database query for performing weighted sampling without replacement may vary based on the database system being utilized or query language supported.

Figure 2:
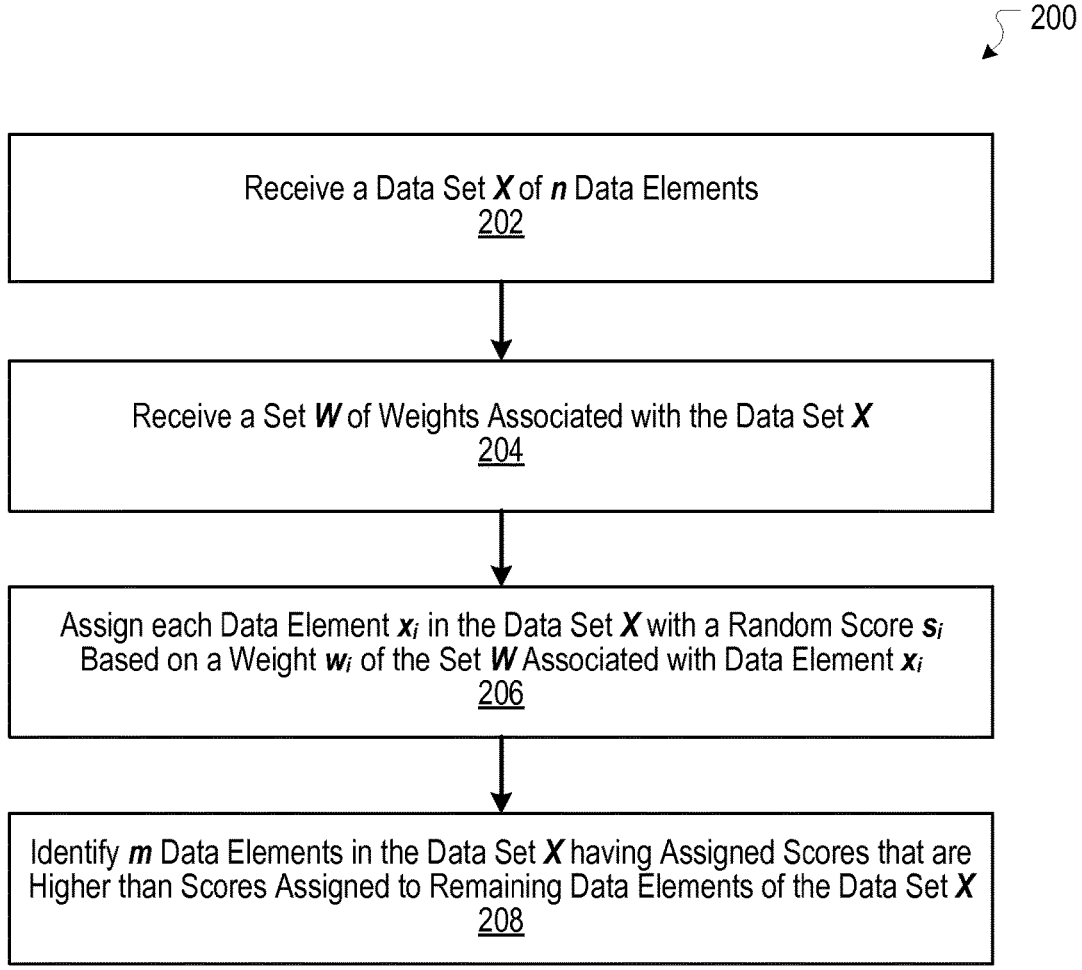
FIG. 2 illustrates an example process for weighted sampling without replacement in accordance with an embodiment of the invention.

FIG. 2 illustrates an example process 200 for weighted sampling without replacement in accordance with an embodiment of the invention. At block 202, a data set X of n data elements is received, on which the weight sampling without replacement may be performed. As described herein, the data set management module 104 may manage one or more data sets on which the weighted sampling system 102 can perform weight sampling without replacement. Accordingly, the data set management module 104 may receive the data set X, which may originate from the data source 100.

At block 204, a set W of weights associated with the data set X is received. As described herein, the set W may include some or all of the weights associated with data elements of the data set X. As also described herein, the weight management module 106 may manage one or more sets of weights associated with the one or more data sets being managed by the data set management module 104.

At block 206, each data element $x_i$ in the data set $X=\{x_1, x_2, x_3, \ldots, x_n\}$ is assigned a random score $s_i$ based on a weight $w_i$ of the set W associated with data element $x_i$. As described herein, the score module 108 may generate the random score for data elements of the data set identified or otherwise obtained by the data set management module 104. The random score may be generated according to Equation 2 as described herein.

At block 208, m data elements are identified in the data set X such that the m data elements have assigned scores that are higher than scores assigned to the remaining data elements of the data set X. As described herein, the sample module 110 may select m data elements for the sample set based on the randomly generated scores that are assigned to them. As also described herein, the sample module 110 may utilize a "Median of Medians" selection algorithm to identify an mth highest score $\bar{s}$, and identify a particular data element of the data elements $x_i$ in the data set X having a particular score $s_i$ where $s_i \geq \bar{s}$.

Figure 3:
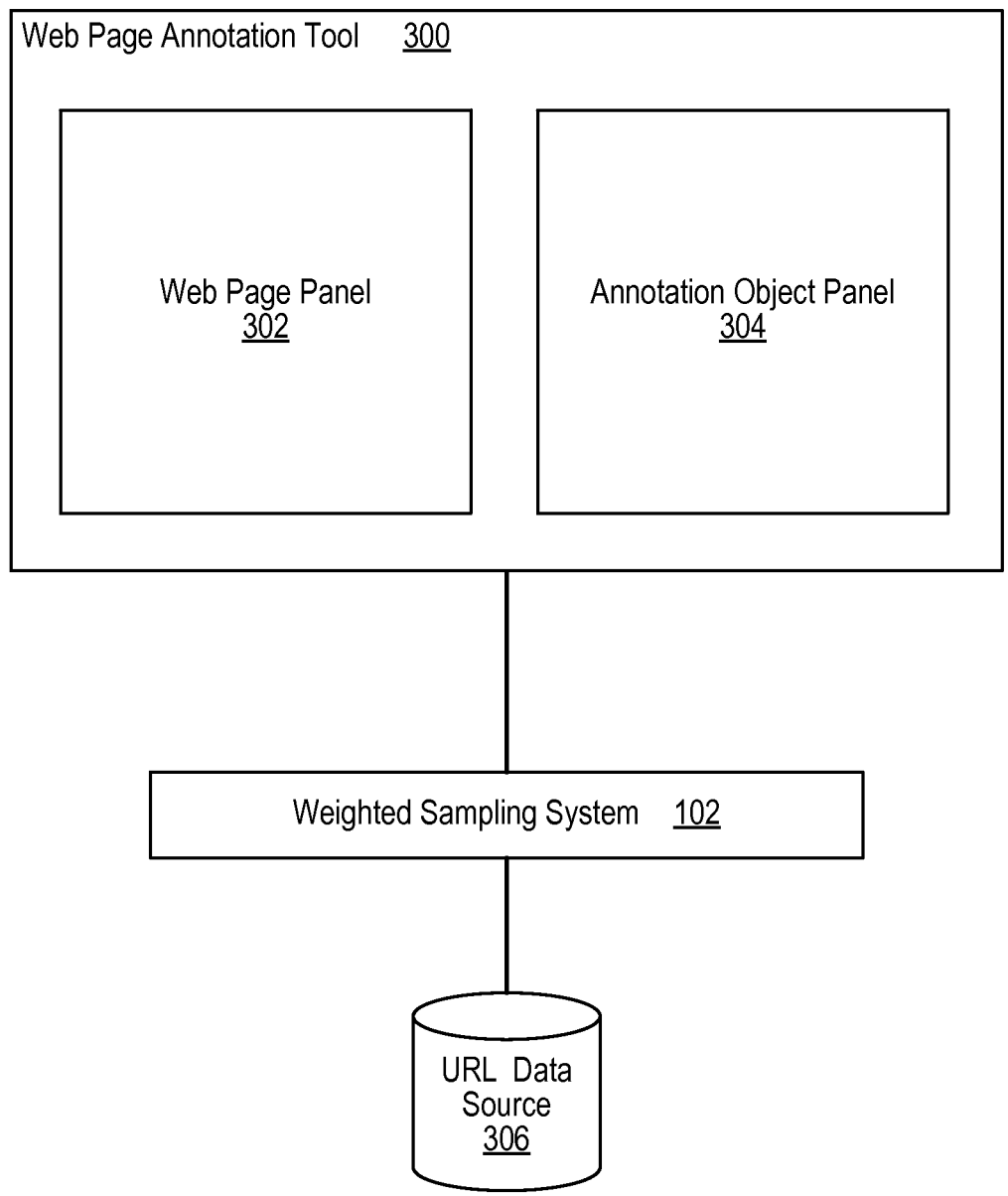
FIG. 3 illustrates an example tool using weighted sampling without replacement in accordance with an embodiment of the invention.

FIG. 3 illustrates an example tool using weighted sampling without replacement in accordance with an embodiment of the invention. As shown, a web page annotation tool 300 of a social networking system is coupled to a universal resource locator (URL) data source 306 through the weighted sampling system 102. As also shown, the web page annotation tool 300 includes a web page panel 302 and an annotation object panel 304.

According to some embodiments, the web page annotation tool 300 may be configured to allow operators of a social networking system to associate one or more annotations with a web page corresponding to a universal resource locator (URL). Examples of such URLs may include those used in postings made by users of a social networking system, such as to a posting-based newsfeed. In some embodiments, when a URL to a web page is used in a user posting, an annotation associated with the web page corresponding to the URL can be automatically added or presented with the posting. The annotation may include title or a short synopsis or description of a given web page. The annotation can be automatically presented or suggested for inclusion in a posting that references a URL corresponding to a web page associated with the annotation. The annotation may be one generated automatically by the social networking system, one manually generated by the social networking system, or some combination thereof (e.g., automatically generated but manually revised). For example, the annotation may be generated or gathered using a scraper process that crawls through web pages and scrapes annotations for the web pages. The scraped annotation can be saved as an annotation object associated with the web pages, and can later be reviewed for accuracy.

A social networking system may have two or more annotation objects associated with the same web page. As such, in some embodiments, the web page annotation tool 300 may permit an operator of the social networking system to review one or more annotation objects associated with a given URL corresponding to a web page. The operator may revise such annotation objects for accuracy as necessary. Revisions to annotation objects may be permitted through the annotation object panel 304.

During review operations, the web page panel 302 may provide an operator of a social networking system with one or more web pages that have yet to be reviewed and associated with an annotation. When a web page is selected in the web page panel 302, one or more annotation objects associated with the selected web page (or the web page's URL) may be presented for review or revision in the annotation object panel 304.

According to some embodiments, the web pages presented in the web page panel 302 for review may be those selected by sampling from a set of URLs corresponding to web pages that have yet to be annotated. To ensure that important web pages receive annotations before others, the web page annotation tool 300 may utilize the weighted sampling system 102 to select by sampling those URLs of web pages based on weights, where the weights indicate the importance of the URLs within the social networking system. In some embodiments, a weight associated with a URL of a web page may be based on its number of impressions in the social networking system (e.g., number of impressions in a news feed) or any other parameter involving the URL (e.g., number of times the URL has been shared or emailed). In particular embodiments, from a set of URLs corresponding to web pages that have yet to be annotated, the weighted sampling system 102 may select m URLs for annotation review based on the assigned random score of the URLs in view of their associated weight. The weighted sampling system 102 may select and retrieve the selected URLs stored at the URL data source 306, which may store URLs and their associated weights.

Many other applications or use cases for the weighted sampling system 102 are possible. For example, such applications and use cases can relate to surveys, data science, machine learning, etc. In an embodiment, such applications and uses cases may involve analysis of data generated by or relating to a social networking system or any other type of system.

For example, the weighted sampling system 102 can be used when performing a survey, such as one to determine a political-contribution-weighted opinion in regard to an issue with respect to donors. A candidate data set can comprise a phone number (or other identifier) for each of n donors in a country and the weights associated with each donor can be the amount of money each donated to politics. Further, the real value 0 can represent a donor "totally against" the issue and the real value 1 can represent a donor "totally supporting" the issue." The weighted sampling system 102 can be used to draw m donors from the candidate data set to contact when conducting the survey. A survey conducted in this manner can estimate the contributed-weighted opinion of the population of donors. In some embodiments, the candidate data set used by of the weighted sampling system 102 for survey applications may comprise data elements relating to users of a social networking system.

In another example, the weighted sampling system 102 can be used when analyzing the behavior of a user of a social networking system. For instance, when performing such an analysis, the weighted sampling system 102 can be used to select m user identifiers corresponding to users of the social networking system (e.g., 10 k users) from a candidate data set of n user identifiers corresponding to users of the social networking system (e.g., more than 1 billion user identifiers), where the users are weighted based on their contribution to revenue (e.g., ad clicks*CPC). The selected m user identifiers represent a sample set on which behavior analysis can be conducted.

In yet another example, the weighted sampling system 102 can be used in training and evaluating machine learning models, where sampling data from a data set source (e.g., database) is necessary (e.g., when the sample space is large enough to be considered "big data"). In some embodiments, the data set sampled by the weighted sampling system 102 for machine learning may comprise data elements generated by or relating to a social networking system. For example, the data set may comprise data elements relating to users of a social networking system, user interactions on the social networking system, operation of subsystems supporting the social networking system, etc. In addition to the foregoing examples, the weighted sampling system 102 can be used in any suitable application involving sampling.

Figure 4:
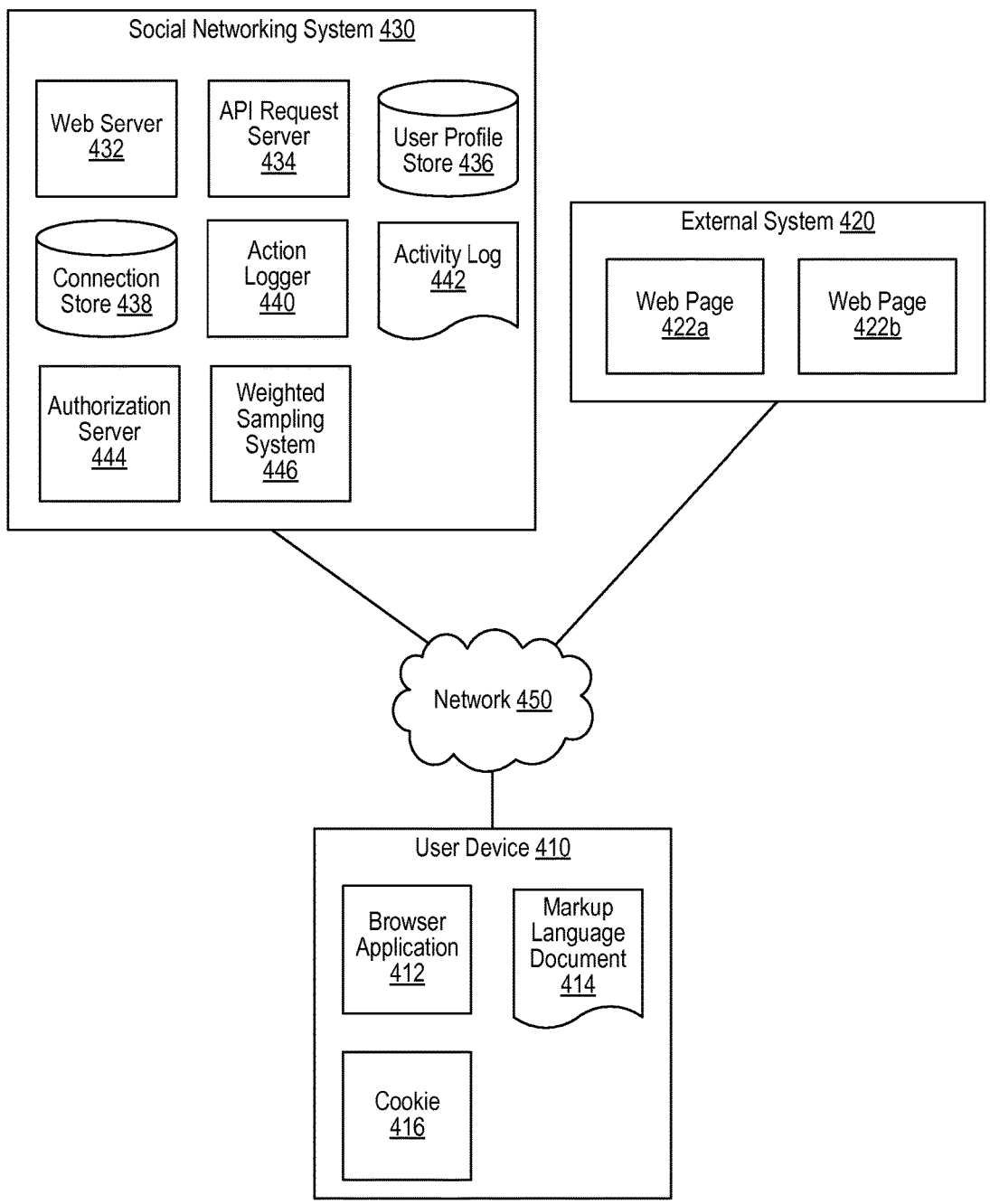
FIG. 4 illustrates an example of a network diagram of a system for weighted sampling without replacement in a social networking system in accordance with an embodiment of the invention.

FIG. 4 is a network diagram of a system 400 for weighted sampling without replacement in a social networking system 430 in accordance with an embodiment of the invention. The system 400 includes one or more user devices 410, one or more external systems 420, the social networking system 430, and a network 450. For purposes of illustration, the embodiment of the system 400, shown by FIG. 4, includes a single external system 420 and a single user device 410. However, in other embodiments, the system 400 may include more user devices 410 and more external systems 420. In certain embodiments, the social networking system 430 is operated by a social network provider, whereas the external systems 420 are separate from the social networking system 430 in that they may be operated by different entities. In various embodiments, however, the social networking system 430 and the external systems 420 operate in conjunction to provide social networking services to users (or members) of the social networking system 430. In this sense, the social networking system 430 provides a platform or backbone, which other systems, such as external systems 420, may use to provide social networking services and functionalities to users across the Internet.

The user device 410 comprises one or more computing devices that can receive input from a user and transmit and receive data via the network 450. In one embodiment, the user device 410 is a conventional computer system executing, for example, a Microsoft Windows compatible operating system (OS), Apple OS X, and/or a Linux distribution. In another embodiment, the user device 410 can be a device having computer functionality, such as a smart-phone, a tablet, a personal digital assistant (PDA), a mobile telephone, etc. The user device 410 is configured to communicate via the network 450. The user device 410 can execute an application, for example, a browser application that allows a user of the user device 410 to interact with the social networking system 430. In another embodiment, the user device 410 interacts with the social networking system 430 through an application programming interface (API) provided by the native operating system of the user device 410, such as iOS and ANDROID. The user device 410 is configured to communicate with the external system 420 and the social networking system 430 via the network 450, which may comprise any combination of local area and wide area networks, using wired and/or wireless communication systems.

In one embodiment, the network 450 uses standard communications technologies and protocols. Thus, the network 450 can include links using technologies such as Ethernet, 402.11, worldwide interoperability for microwave access (WiMAX), 3G, 4G, CDMA, GSM, LTE, digital subscriber line (DSL), etc. Similarly, the networking protocols used on the network 450 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 450 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 410 may display content from the external system 420 and/or from the social networking system 430 by processing a markup language document 414 received from the external system 420 and from the social networking system 430 using a browser application 412. The markup language document 414 identifies content and one or more instructions describing formatting or presentation of the content. By executing the instructions included in the markup language document 414, the browser application 412 displays the identified content using the format or presentation described by the markup language document 414. For example, the markup language document 414 includes instructions for generating and displaying a web page having multiple frames that include text and/or image data retrieved from the external system 420 and the social networking system 430. In various embodiments, the markup language document 414 comprises a data file including extensible markup language (XML) data, extensible hypertext markup language (XHTML) data, or other markup language data. Additionally, the markup language document 414 may include JavaScript Object Notation (JSON) data, JSON with padding (JSONP), and JavaScript data to facilitate data-interchange between the external system 420 and the user device 410. The browser application 412 on the user device 410 may use a JavaScript compiler to decode the markup language document 414.

The markup language document 414 may also include, or link to, applications or application frameworks such as FLASH™ or Unity™ applications, the SilverLight™ application framework, etc.

In one embodiment, the user device 410 also includes one or more cookies 416 including data indicating whether a user of the user device 410 is logged into the social networking system 430, which may enable customization of the data communicated from the social networking system 430 to the user device 410.

The external system 420 includes one or more web servers that include one or more web pages 422a, 422b, which are communicated to the user device 410 using the network 450. The external system 420 is separate from the social networking system 430. For example, the external system 420 is associated with a first domain, while the social networking system 430 is associated with a separate social networking domain. Web pages 422a, 422b, included in the external system 420, comprise markup language documents 414 identifying content and including instructions specifying formatting or presentation of the identified content.

The social networking system 430 includes one or more computing devices for a social network, including a plurality of users, and providing users of the social network with the ability to communicate and interact with other users of the social network. As described herein, the social network can be represented by a graph, i.e., a data structure including edges and nodes. Other data structures can also be used to represent the social network, including but not limited to databases, objects, classes, meta elements, files, or any other data structure.

Users may join the social networking system 430 and then add connections to any number of other users of the social networking system 430 to whom they desire to be connected. As used herein, the term "friend" refers to any other user of the social networking system 430 to whom a user has formed a connection, association, or relationship via the social networking system 430. For example, in an embodiment, if users in the social networking system 430 are represented as nodes in the social graph, the term "friend" can refer to an edge formed between and directly connecting two user nodes.

Connections may be added explicitly by a user or may be automatically created by the social networking system 430 based on common characteristics of the users (e.g., users who are alumni of the same educational institution). For example, a first user specifically selects a particular other user to be a friend. Connections in the social networking system 430 are usually in both directions, but need not be, so the terms "user" and "friend" depend on the frame of reference. Connections between users of the social networking system 430 are usually bilateral ("two-way"), or "mutual," but connections may also be unilateral, or "one-way." For example, if Bob and Joe are both users of the social networking system 430 and connected to each other, Bob and Joe are each other's connections. If, on the other hand, Bob wishes to connect to Joe to view data communicated to the social networking system 430 by Joe, but Joe does not wish to form a mutual connection, a unilateral connection may be established. The connection between users may be a direct connection; however, some embodiments of the social networking system 430 allow the connection to be indirect via one or more levels of connections or degrees of separation.

In addition to establishing and maintaining connections between users and allowing interactions between users, the social networking system 430 provides users with the ability to take actions on various types of items supported by the social networking system 430. These items may include groups or networks (i.e., social networks of people, entities, and concepts) to which users of the social networking system 430 may belong, events or calendar entries in which a user might be interested, computer-based applications that a user may use via the social networking system 430, transactions that allow users to buy or sell items via services provided by or through the social networking system 430, and interactions with advertisements that a user may perform on or off the social networking system 430. These are just a few examples of the items upon which a user may act on the social networking system 430, and many others are possible. A user may interact with anything that is capable of being represented in the social networking system 430 or in the external system 420, separate from the social networking system 430, or coupled to the social networking system 430 via the network 450.

The social networking system 430 is also capable of linking a variety of entities. For example, the social networking system 430 enables users to interact with each other as well as external systems 420 or other entities through an API, a web service, or other communication channels. As discussed herein, the social networking system 430 can generate and maintain a "social graph" comprising a plurality of nodes interconnected by a plurality of edges, where each node in the social graph may represent an entity that can act on another node and/or that can be acted on by another node. The social graph may include various types of nodes, including, for example, users, non-person entities, content items, web pages, groups, activities, messages, concepts, and any other things that can be represented by an object in the social networking system 430. As noted herein, an edge between two nodes in the social graph may represent a particular kind of connection, or association, between the two nodes, which may result from node relationships or from an action that was performed by one of the nodes on the other node. As further discussed, the edges between nodes can be weighted, where the weight of an edge can represent an attribute associated with the edge, such as a strength of the connection or association between nodes. Different types of edges can be provided with different weights.

The social networking system 430 also includes user-generated content, which enhances a user's interactions with the social networking system 430. User-generated content may include anything a user can add, upload, send, or "post" to the social networking system 430. For example, a user communicates posts to the social networking system 430 from a user device 410. Posts may include data such as status updates or other textual data, location information, images such as photos, videos, links, music or other similar data and/or media. Content may also be added to the social networking system 430 by a third-party. Content "items" are represented as objects in the social networking system 430. In this way, users of the social networking system 430 are encouraged to communicate with each other by posting text and content items of various types of media through various communication channels. Such communication increases the interaction of users with each other and increases the frequency with which users interact with the social networking system 430.

The social networking system 430 includes a web server 432, an API request server 434, a user profile store 436, a connection store 438, an action logger 440, an activity log 442, an authorization server 444, and a weighted sampling system 446. In an embodiment of the invention, the social networking system 430 may include additional, fewer, or different components for various applications. Other components, such as network interfaces, security mechanisms, load balancers, failover servers, management and network operations consoles, and the like are not shown so as to not obscure the details of the system.

The user profile store 436 maintains information about user accounts, including biographic, demographic, and other types of descriptive information, such as work experience, educational history, hobbies or preferences, location, and the like that has been declared by users or inferred by the social networking system 430. This information is stored in the user profile store 436 such that each user is uniquely identified. The social networking system 430 also stores data describing one or more connections between different users in the connection store 438. The connection information may indicate users who have similar or common work experience, group memberships, hobbies, or educational history. Additionally, the social networking system 430 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 430, such as non-person entities, buckets, cluster centers, images, interests, pages, external systems, concepts, and the like are also stored in the connection store 438.

The social networking system 430 maintains data about objects with which a user may interact. To maintain this data, the user profile store 436 and the connection store 438 store instances of the corresponding type of objects maintained by the social networking system 430. Each object type has information fields that are suitable for storing information appropriate to the type of object. For example, the user profile store 436 contains data structures with fields suitable for describing a user's account and information related to a user's account. When a new object of a particular type is created, the social networking system 430 initializes a new data structure of the corresponding type, assigns a unique object identifier to it, and begins to add data to the object as needed. This might occur, for example, when a user becomes a user of the social networking system 430, the social networking system 430 generates a new instance of a user profile in the user profile store 436, assigns a unique identifier to the user account, and begins to populate the fields of the user account with information provided by the user.

The connection store 438 includes data structures suitable for describing a user's connections to other users, connections to external systems 420 or connections to other entities. The connection store 438 may also associate a connection type with a user's connections, which may be used in conjunction with the user's privacy setting to regulate access to information about the user. In an embodiment of the invention, the user profile store 436 and the connection store 438 may be implemented as a federated database.

Data stored in the connection store 438, the user profile store 436, and the activity log 442 enables the social networking system 430 to generate the social graph that uses nodes to identify various objects and edges connecting nodes to identify relationships between different objects. For example, if a first user establishes a connection with a second user in the social networking system 430, user accounts of the first user and the second user from the user profile store 436 may act as nodes in the social graph. The connection between the first user and the second user stored by the connection store 438 is an edge between the nodes associated with the first user and the second user. Continuing this example, the second user may then send the first user a message within the social networking system 430. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 430 (or, alternatively, in an image maintained by another system outside of the social networking system 430). The image may itself be represented as a node in the social networking system 430. This tagging action may create edges between the first user and the second user as well as create an edge between each of the users and the image, which is also a node in the social graph. In yet another example, if a user confirms attending an event, the user and the event are nodes obtained from the user profile store 436, where the attendance of the event is an edge between the nodes that may be retrieved from the activity log 442. By generating and maintaining the social graph, the social networking system 430 includes data describing many different types of objects and the interactions and connections among those objects, providing a rich source of socially relevant information.

The web server 432 links the social networking system 430 to one or more user devices 410 and/or one or more external systems 420 via the network 450. The web server 432 serves web pages, as well as other web-related content, such as Java, JavaScript, Flash, XML, and so forth. The web server 432 may include a mail server or other messaging functionality for receiving and routing messages between the social networking system 430 and one or more user devices 410. The messages can be instant messages, queued messages (e.g., email), text and SMS messages, or any other suitable messaging format.

The API request server 434 allows one or more external systems 420 and user devices 410 to call access information from the social networking system 430 by calling one or more API functions. The API request server 434 may also allow external systems 420 to send information to the social networking system 430 by calling APIs. The external system 420, in one embodiment, sends an API request to the social networking system 430 via the network 450, and the API request server 434 receives the API request. The API request server 434 processes the request by calling an API associated with the API request to generate an appropriate response, which the API request server 434 communicates to the external system 420 via the network 450. For example, responsive to an API request, the API request server 434 collects data associated with a user, such as the user's connections that have logged into the external system 420, and communicates the collected data to the external system 420. In another embodiment, the user device 410 communicates with the social networking system 430 via APIs in the same manner as external systems 420.

The action logger 440 is capable of receiving communications from the web server 432 about user actions on and/or off the social networking system 430. The action logger 440 populates the activity log 442 with information about user actions, enabling the social networking system 430 to discover various actions taken by its users within the social networking system 430 and outside of the social networking system 430. Any action that a particular user takes with respect to another node on the social networking system 430 may be associated with each user's account, through information maintained in the activity log 442 or in a similar database or other data repository. Examples of actions taken by a user within the social networking system 430 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 430, the action is recorded in the activity log 442. In one embodiment, the social networking system 430 maintains the activity log 442 as a database of entries. When an action is taken within the social networking system 430, an entry for the action is added to the activity log 442. The activity log 442 may be referred to as an action log.

Additionally, user actions may be associated with concepts and actions that occur within an entity outside of the social networking system 430, such as an external system 420 that is separate from the social networking system 430. For example, the action logger 440 may receive data describing a user's interaction with an external system 420 from the web server 432. In this example, the external system 420 reports a user's interaction according to structured actions and objects in the social graph.

Other examples of actions where a user interacts with an external system 420 include a user expressing an interest in an external system 420 or another entity, a user posting a comment to the social networking system 430 that discusses an external system 420 or a web page 422a within the external system 420, a user posting to the social networking system 430 a Uniform Resource Locator (URL) or other identifier associated with an external system 420, a user attending an event associated with an external system 420, or any other action by a user that is related to an external system 420. Thus, the activity log 442 may include actions describing interactions between a user of the social networking system 430 and an external system 420 that is separate from the social networking system 430.

The authorization server 444 enforces one or more privacy settings of the users of the social networking system 430. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 420, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 420. One embodiment allows the specification of the set of entities to comprise an enumeration of entities. For example, the user may provide a list of external systems 420 that are allowed to access certain information. Another embodiment allows the specification to comprise a set of entities along with exceptions that are not allowed to access the information. For example, a user may allow all external systems 420 to access the user's work information, but specify a list of external systems 420 that are not allowed to access the work information. Certain embodiments call the list of exceptions that are not allowed to access certain information a "block list". External systems 420 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 444 contains logic to determine if certain information associated with a user can be accessed by a user's friends, external systems 420, and/or other applications and entities. The external system 420 may need authorization from the authorization server 444 to access the user's more private and sensitive information, such as the user's work phone number. Based on the user's privacy settings, the authorization server 444 determines if another user, the external system 420, an application, or another entity is allowed to access information associated with the user, including information about actions taken by the user.

As described above in further detail, the weighted sampling system 446 contains logic that enables a social networking system 430 to perform weighted sampling without replacement in accordance with some embodiments. As described herein, the social networking system 430 may perform weighted sampling without replacement on data generated by various components of the social networking system 430. In an embodiment, the weighted sampling system 446 receive may receive a data set relating to any dimension of the social networking system 430, such as event log data, user survey information, user behavior information, impressions (e.g., pictures, videos, postings, universal resource locators), etc. The weighted sampling system 446 may be utilized with tools that improve or otherwise facilitate analysis on the operation of the social networking system 430.

Figure 5:
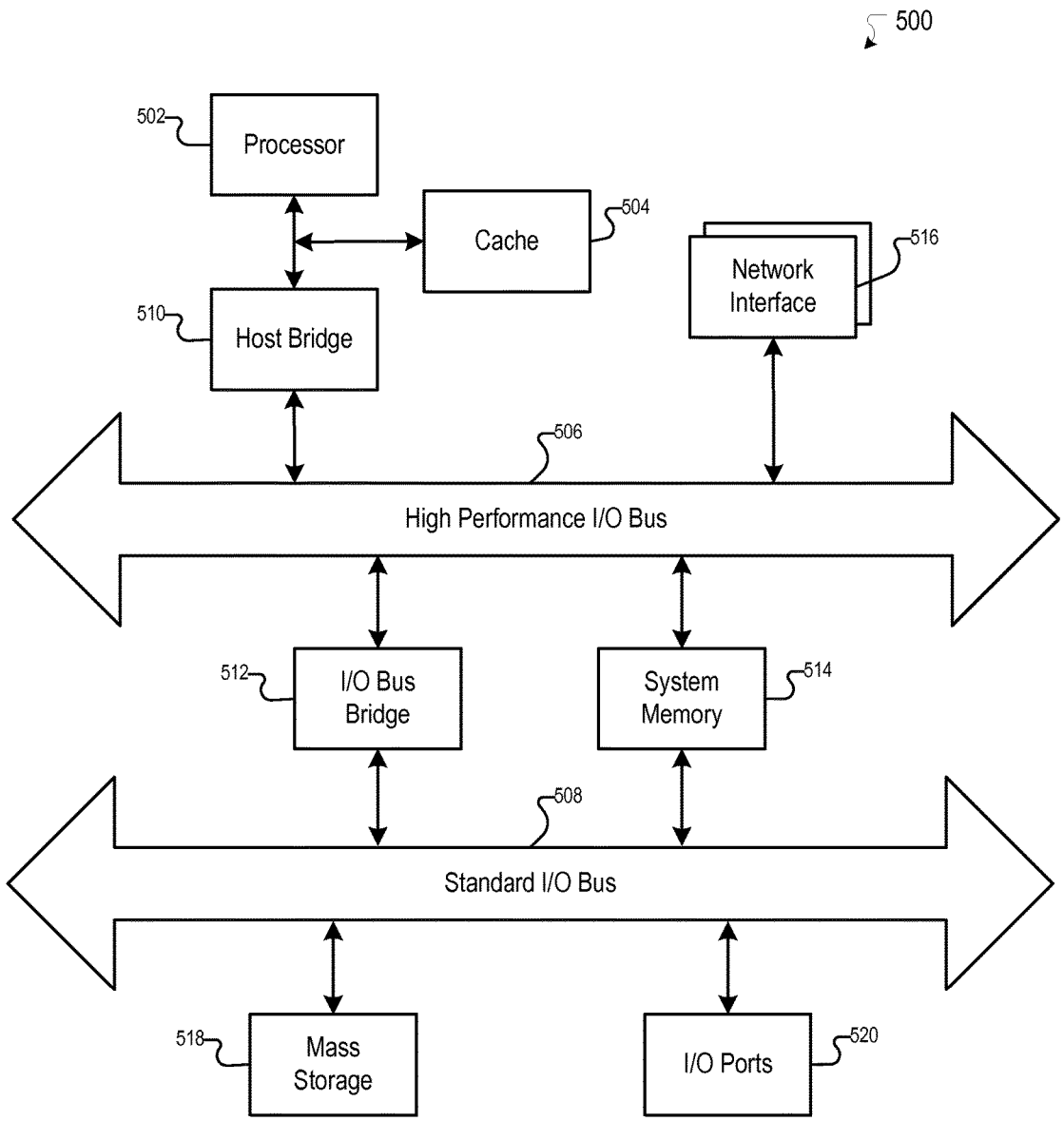
FIG. 5 illustrates a diagram of a computer system in accordance with an embodiment of the invention.

The foregoing processes and features can be implemented by a wide variety of machine and computer system architectures and in a wide variety of network and computing environments. FIG. 5 illustrates an example of a computer system 500 that may be used to implement one or more of the computing devices identified above. The computer system 500 includes sets of instructions for causing the computer system 500 to perform the processes and features discussed herein. The computer system 500 may be connected (e.g., networked) to other machines. In a networked deployment, the computer system 500 may operate in the capacity of a server machine or a client machine in a client-server network environment, or as a peer machine in a peer-to-peer (or distributed) network environment. In an embodiment of the invention, the computer system 500 may be one of the data source 100, the weighted sampling system, the web page annotation tool 300, the URL data source 306, the social networking system 730, or a component thereof. For example, each leaf node described herein (e.g., the leaf nodes 212) can be implemented by an independent computer system similar to the computer system 500.

The computer system 500 includes a processor 502, a cache memory 504, and one or more executable modules and drivers, stored on a computer-readable medium, directed to the processes and features described herein. Additionally, the computer system 500 includes a high performance input/output (I/O) bus 506 and a standard I/O bus 508. A host bridge 510 couples the processor 502 to the high performance I/O bus 506, whereas I/O bus bridge 512 couples the two buses 506 and 508 to each other. A system memory 514 and one or more network interfaces 516 couple to the bus 506. The computer system 500 may further include video memory and a display device coupled to the video memory (not shown). Mass storage 518 and I/O ports 520 couple to the bus 508. The computer system 500 may optionally include a keyboard and pointing device, a display device, or other input/output devices (not shown) coupled to the bus 508. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 500, including the input and output of data to and from software applications (not shown). The operating system provides an interface between the software applications being executed on the system and the hardware components of the system. Any suitable operating system may be used, such as the LINUX Operating System; the Apple Macintosh Operating System, available from Apple Computer Inc. of Cupertino, Calif.; UNIX operating systems; Microsoft® Windows® operating systems; BSD operating systems; and the like. Other implementations are possible.

The elements of the computer system 500 are described in greater detail below. In particular, the network interface 516 provides communication between the computer system 500 and any of a wide range of networks, such as an Ethernet (e.g., IEEE 502.3) network, a backplane, etc. The mass storage 518 provides permanent storage for the data and programming instructions to perform the above-described processes and features implemented by the respective computing systems identified above, whereas the system memory 514 (e.g., DRAM) provides temporary storage for the data and programming instructions when executed by the processor 502. The I/O ports 520 may be one or more serial and/or parallel communication ports that provide communication between additional peripheral devices, which may be coupled to the computer system 500.

The computer system 500 may include a variety of system architectures, and various components of the computer system 500 may be rearranged. For example, the cache 504 may be on-chip with processor 502. Alternatively, the cache 504 and the processor 502 may be packed together as a "processor module", with processor 502 being referred to as the "processor core". Furthermore, certain embodiments of the invention may neither require nor include all of the above components. For example, peripheral devices coupled to the standard I/O bus 508 may couple to the high performance I/O bus 506. In addition, in some embodiments, only a single bus may exist, with the components of the computer system 500 being coupled to the single bus. Furthermore, the computer system 500 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 500 which, when read and executed by one or more processors, cause the computer system 500 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 500, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 502. Initially, the series of instructions may be stored on a storage device, such as the mass storage 518. However, the series of instructions can be stored on any suitable computer readable storage medium. Furthermore, the series of instructions need not be stored locally, and could be received from a remote storage device, such as a server on a network, via the network interface 516. The instructions are copied from the storage device, such as the mass storage 518, into the system memory 514, and then accessed and executed by processor 502. In various implementations, a module or modules can be executed by a processor or multiple processors in one or multiple locations, such as multiple servers in a parallel processing environment.

Examples of computer readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer system comprising:
at least one processor; and
a memory storing instructions configured to instruct the at least one processor to perform:
identifying a data set X of n unannotated web pages from which to generate a sample set of m unannotated web pages, wherein n≥m, each unannotated web page $x_i$ of the data set X is associated with a URL posted to a posting-based newsfeed of a social networking system by one or more users of the social networking system, each unannotated web page $x_i$ of the data set X has a weight $w_i$ associated with the unannotated web page $x_i$, the weight $w_i$ of each unannotated web page $x_i$ is indicative of an importance of the unannotated web page $x_i$, and the data set X comprises data generated by the social networking system;
assigning each unannotated web page in the data set X with a random score $s_i$ based on the weight $w_i$ associated with the unannotated web page $x_i$, wherein the random score $s_i$ is generated according to the following formula: $s_i = r^{1/wi}$, where r is a [0,1] real value drawn uniformly at random;

identifying the m unannotated web pages in the data set X, wherein the m unannotated web pages have assigned scores that are higher than scores assigned to remaining unannotated web pages of the data set X;

automatically identifying a set of annotations for the m unannotated web pages based on a scraper process, each unannotated web page of the m unannotated web pages being associated with at least one annotation of the set of annotations; and providing the m unannotated web pages and the set of annotations for presentation in a web page panel for review by an operator.

2. The computer system of claim 1, wherein the instructions are configured to instruct the at least one processor to further perform: generating random scores $s_i$.

3. The computer system of claim 2, wherein r is drawn with a random number generator.

4. The computer system of claim 1, wherein the identifying the m unannotated web pages comprises:
using a Median of Medians algorithm to identify an mth highest score $\hat{s}$; and
identifying a particular unannotated web page of the unannotated web pages $x_i$ in the data set X having a particular score $s_i$ where $s_i \geq \hat{s}$.

5. The computer system of claim 1, wherein the identifying the m unannotated web pages comprises performing a structured query language (SQL) query.

6. The computer system of claim 5, wherein the SQL query comprises a SELECT command configured to order data rows using scores assigned to the unannotated web pages of the set X.

7. The computer system of claim 6, wherein the SELECT command is further configured to limit the data rows to m rows.

8. The computer system of claim 1, wherein a probability of drawing the unannotated web page $x_i$ from the data set X is based on the associated weight $w_i$.

9. The computer system of claim 1, wherein the identifying the data set X of n unannotated web pages comprises selecting the data set X.

10. The computer system of claim 1, wherein the identifying the data set X of n unannotated web pages comprises determining a set W including some or all of the weights associated with the data set X.

11. The computer system of claim 1, wherein the instructions are configured to instruct the at least one processor to further perform: determining a set W including some or all of the weights associated with the data set X.

12. The computer system of claim 1, wherein the data generated by the social networking system comprises data used for machine learning.

13. The computer system of claim 1, wherein the data generated by the social networking system comprises user behavior information.

14. The computer system of claim 1, wherein the weight $w_i$ of each unannotated web page is based on a number of impressions of each unannotated web page on the social networking system.

15. The computer system of claim 1, wherein the weight $w_i$ of each unannotated web page is based on a number of times each unannotated web page has been shared on the social networking system.

16. A non-transitory computer-storage medium storing computer-executable instructions that, when executed, cause a computer system to perform a computer-implemented method comprising:
identifying a data set X of n unannotated web pages from which to generate a sample set of m unannotated web pages, wherein n≥m, each unannotated web page $x_i$ of the data set X is associated with a URL posted to a posting-based newsfeed of a social networking system by one or more users of the social networking system, each unannotated web page $x_i$ of the data set X has a weight $w_i$ associated with the unannotated web page $x_i$, the weight $w_i$ of each unannotated web page $x_i$ is indicative of an importance of the unannotated web page $x_i$, and the data set X comprises data generated by the social networking system;

assigning each unannotated web page $x_i$ in the data set X with a random score $s_i$ based on the weight $w_i$ associated with the unannotated web page $x_i$, wherein the random score $s_i$ is generated according to the following formula: $s_i = r^{1/wi}$, where r is a [0,1] real value drawn uniformly at random;

identifying the m unannotated web pages in the data set X, wherein the m unannotated web pages have assigned scores that are higher than scores assigned to remaining unannotated web pages of the data set X;

automatically identifying a set of annotations for the m unannotated web pages based on a scraper process, each unannotated web page of the m unannotated web pages being associated with at least one annotation of the set of annotations; and providing the m unannotated web pages and the set of annotations for presentation in a web page panel for review by an operator.

17. A computer implemented method comprising:
identifying, by a computer system, a data set X of n unannotated web pages from which to generate a sample set of m unannotated web pages, wherein n≥m, each unannotated web page $x_i$ of the data set X is associated with a URL posted to a posting-based newsfeed of a social networking system by one or more users of the social networking system, each unannotated web page $x_i$ of the data set X has a weight $w_i$ associated with the unannotated web page $x_i$, and the data set X comprises data generated by the social networking system;

assigning, by the computer system, each unannotated web page in the data set X with a random score $s_i$ based on the weight $w_i$ associated with the unannotated web page $x_i$, wherein the random score $s_i$ is generated according to the following formula: $s_i = r^{1/wi}$, where r is a [0,1] real value drawn uniformly at random;

identifying, by the computer system, the m unannotated web pages in the data set X, wherein the m unannotated web pages have assigned scores that are higher than scores assigned to remaining unannotated web pages of the data set X;

automatically identifying a set of annotations for the m unannotated web pages based on a scraper process, each unannotated web page of the m unannotated web pages being associated with at least one annotation of the set of annotations; and providing the m unannotated web pages and the set of annotations for presentation in a web page panel for review by an operator.

* * * * *